US012568437B2

(12) United States Patent
He

(10) Patent No.: US 12,568,437 B2
(45) Date of Patent: Mar. 3, 2026

(54) PAGING INDICATION METHOD, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 498 days.

(21) Appl. No.: 18/073,214

(22) Filed: Dec. 1, 2022

(65) Prior Publication Data

US 2023/0097949 A1     Mar. 30, 2023

Related U.S. Application Data

(63) Continuation of application No. PCT/CN2020/107935, filed on Aug. 7, 2020.

(51) Int. Cl.
*H04W 52/02* (2009.01)
*H04W 68/02* (2009.01)

(52) U.S. Cl.
CPC ....... *H04W 52/0235* (2013.01); *H04W 68/02* (2013.01)

(58) Field of Classification Search
CPC ......... H04W 52/0235; H04W 52/0229; H04W 52/0225; H04W 52/0274; H04W 68/02; H04W 68/025; H04W 68/005; H04W 76/11; Y02D 30/70
See application file for complete search history.

(56) References Cited

U.S. PATENT DOCUMENTS

| | | | |
|---|---|---|---|
| 10,356,752 B1 | 7/2019 | Menon et al. | |
| 12,010,624 B2 * | 6/2024 | Seo .................... | H04W 52/0235 |
| 12,200,717 B2 * | 1/2025 | Xue ..................... | H04L 5/0087 |
| 2017/0127381 A1 | 5/2017 | Yavus et al. | |
| 2017/0318620 A1 * | 11/2017 | Tseng ........................ | H04L 1/08 |

(Continued)

FOREIGN PATENT DOCUMENTS

| | | |
|---|---|---|
| CN | 109286966 A | 1/2019 |
| CN | 110972237 A | 4/2020 |

(Continued)

OTHER PUBLICATIONS

Extended European Search Report dated May 15, 2023 received in European Patent Application No. EP20948620.8.

(Continued)

*Primary Examiner* — Sujoy K Kundu
*Assistant Examiner* — Vladislav Y Agureyev
(74) *Attorney, Agent, or Firm* — Sheppard, Mullin, Richter & Hampton LLP

(57) ABSTRACT

The present disclosure discloses a paging indication method. The method includes: receiving, by a terminal device, power saving indication information in a first search space set. The power saving indication information indicates whether the terminal device needs to receive a paging message in a target paging occasion group or a target paging frame group. The present disclosure further discloses another paging indication method, an electronic device, and a storage medium.

20 Claims, 5 Drawing Sheets

Receiving, by a terminal device, power saving indication information in a first search space set, the power saving indication information indicating whether the terminal device needs to receive a paging message in a target paging occasion group or a target paging frame group     S201

(56) References Cited

U.S. PATENT DOCUMENTS

| | | | | |
|---|---|---|---|---|
| 2019/0239189 | A1* | 8/2019 | Hwang | H04W 52/0216 |
| 2019/0254110 | A1* | 8/2019 | He | H04W 76/28 |
| 2020/0092813 | A1* | 3/2020 | Kim | H04L 1/0072 |
| 2020/0145960 | A1 | 5/2020 | Tang | |
| 2020/0169982 | A1 | 5/2020 | Höglund | |
| 2020/0229092 | A1* | 7/2020 | Wu | H04W 76/28 |
| 2020/0314816 | A1* | 10/2020 | Yi | H04L 5/0094 |
| 2020/0367167 | A1* | 11/2020 | Nam | H04W 76/28 |
| 2020/0396687 | A1* | 12/2020 | Hwang | H04W 68/025 |
| 2021/0045056 | A1* | 2/2021 | Nam | H04W 52/0216 |
| 2021/0051589 | A1* | 2/2021 | Nam | H04W 52/0216 |
| 2021/0136685 | A1* | 5/2021 | Sun | H04W 52/0209 |
| 2021/0153127 | A1* | 5/2021 | Park | H04W 72/23 |
| 2021/0195518 | A1* | 6/2021 | Su | H04W 72/23 |
| 2021/0219329 | A1* | 7/2021 | Zhou | H04L 1/1819 |
| 2021/0243763 | A1* | 8/2021 | Zhou | H04W 72/23 |
| 2021/0297987 | A1* | 9/2021 | Hwang | H04W 52/0235 |
| 2021/0321446 | A1* | 10/2021 | Lee | H04L 5/0044 |
| 2021/0329552 | A1* | 10/2021 | Yang | H04W 52/0229 |
| 2021/0337471 | A1* | 10/2021 | Hu | H04W 68/02 |
| 2021/0352581 | A1* | 11/2021 | Wong | H04W 52/0235 |
| 2022/0015035 | A1* | 1/2022 | Choi | H04L 5/0053 |
| 2022/0053470 | A1* | 2/2022 | Chen | H04L 1/0061 |
| 2022/0110181 | A1* | 4/2022 | Miao | H04L 5/0023 |
| 2022/0132425 | A1* | 4/2022 | Seo | H04W 52/02 |
| 2022/0140943 | A1* | 5/2022 | Zhang | H04W 72/0446 370/329 |
| 2022/0159702 | A1* | 5/2022 | Seo | H04L 5/0094 |
| 2022/0182942 | A1* | 6/2022 | Guo | H04W 52/0235 |
| 2022/0248329 | A1* | 8/2022 | Peng | H04W 52/0216 |
| 2022/0279447 | A1* | 9/2022 | Zhou | H04W 76/28 |
| 2022/0303902 | A1* | 9/2022 | Tao | H04W 72/0446 |
| 2022/0338119 | A1* | 10/2022 | Seo | H04W 72/044 |
| 2022/0369283 | A1* | 11/2022 | Ma | H04W 68/02 |
| 2023/0011965 | A1* | 1/2023 | Ma | H04W 52/0229 |
| 2023/0049043 | A1* | 2/2023 | Li | H04L 1/1864 |
| 2023/0171732 | A1* | 6/2023 | Breuer | H04W 68/02 455/458 |
| 2023/0284180 | A1* | 9/2023 | Oh | H04B 7/088 370/329 |

FOREIGN PATENT DOCUMENTS

| | | | | | |
|---|---|---|---|---|---|
| CN | 111194074 | A | | 5/2020 | |
| CN | 111491399 | A | | 8/2020 | |
| CN | 112788715 | A | * | 5/2021 | H04W 52/0212 |
| CN | 116847442 | A | * | 10/2023 | H04W 52/0235 |
| EP | 3606198 | A1 | | 2/2020 | |
| EP | 3716697 | A1 | * | 9/2020 | H04W 72/23 |
| EP | 3744130 | B1 | * | 6/2022 | H04W 52/0235 |
| EP | 4027559 | A1 | * | 7/2022 | H04W 72/23 |
| EP | 3295733 | B1 | * | 10/2024 | H04W 68/025 |
| WO | 2019007054 | A | | 1/2019 | |
| WO | 2020034218 | A | | 2/2020 | |
| WO | 2020037319 | A1 | | 2/2020 | |
| WO | 2020064930 | A1 | | 4/2020 | |
| WO | WO-2020222589 | A1 | * | 11/2020 | H04W 72/04 |
| WO | WO-2021017626 | A1 | * | 2/2021 | H04W 76/28 |

OTHER PUBLICATIONS

Huawei et al:"Consideration and evaluation on power saving signal in NB-IoT" 3GPP Draft: R1-1712113,3RD Generation Partnership Project(3GPP),Mobile Competence Centre ;650Route Des Lucioles; F-06921 Sophia-Antipolis Cedex France vol. RAN WG1,No. Prague,Czech Republic; Aug. 21, 2017-Aug. 25, 2017, Aug. 21, 2017(Aug. 21, 2017), XP051314933, 15 pages.

CMCC:"Consideration on resource of power saving signal for paging monitoring" 3GPP Draft: R1-1902342,3rd Generation Partnership Project(3GPP),Mobile Competence Centre ;650 Route Des Lucioles : F-06921 Sophia-Antipolis Cedex:France vol. RAN WG1,No. Athens,Greece; Feb. 25, 2019-Mar. 1, 2019, Feb. 16, 2019 (Feb. 16, 2019), XP051600036, 4 pages.

International Search Report and Written Opinion dated Apr. 25, 2021 in International Application No. PCT/CN2020/107935. English translation attached.

Vivo. "3GPP TSG RAN WG1 #99, Reno, USA, Nov. 18-22, 2019, R1-1912049," Remaining aspects of PDCCH-based power saving signal, Nov. 9, 2019 (Nov. 9, 2019), chapter 2.

Sony. "3GPP TSG RAN WG1 #98bis, Chongqing, PR China, Oct. 14-18, 2019, R1-1910751," On PDCCH-based power saving channel, 7.2.9.1, Oct. 4, 2019(Oct. 4, 2019), chapters 2-5.

"3GPP TS 38.212 v16.1.0, Technical Specification Group Radio Access Network; NR;" Multiplexing and channel coding(release 16), Mar. 2020(Mar. 2020), sections 7.3.1.3.7, 7.3.1.2.1.

"3GPP TS 38.331 V16.0.0, 3rd Generation Partnership Project; Technical Specification Group Radio Access Network;" Radio Resource Control (RRC) protocol specification(release 16), Mar. 2020(Mar. 2020), sections 6.5, p. 726.

"3GPP TS 38.212 V16.7.0, 3rd Generation Partnership Project; Technical Specification Group Radio Access Network; NR;" Multiplexing and channel coding(Release 16), Sep. 2021(Sep. 2021), section 10.3.

"3GPP TS 38.213 V16.7.0, 3rd Generation Partnership Project; Technical Specification Group Radio Access Network; NR;" Physical layer procedures for control(Release 16), Sep. 2021(Sep. 2021), section 7.3.1.3.7.

Office Action issued by the Chinese Patent Office for Application No. 202310203397.3 mailed on Oct. 25, 2024.

"Paging in NR with Beam Sweeping", MediaTek Inc., 3GPP TSG-RAN WG2 Meeting #97, R2-1701331, Athens, Greece, Feb. 13-17, 2017.

"Paging design consideration", Spreadtrum Communications, 3GPP TSG RAN WG1#90bis, R1-1717750, Prague, CZ, Oct. 9-13, 2017.

Office Action issued by the Chinese Patent Office for Application No. 202310203397.3 mailed on Aug. 9, 2024.

Communication pursuant to Article 94(3) EPC issued by the European Patent Office for Application No. EP20948620.8 mailed on Jul. 3, 2024.

Communication pursuant to Article 94(3) EPC for European application 20948620.8 mailed Jan. 25, 2024.

* cited by examiner

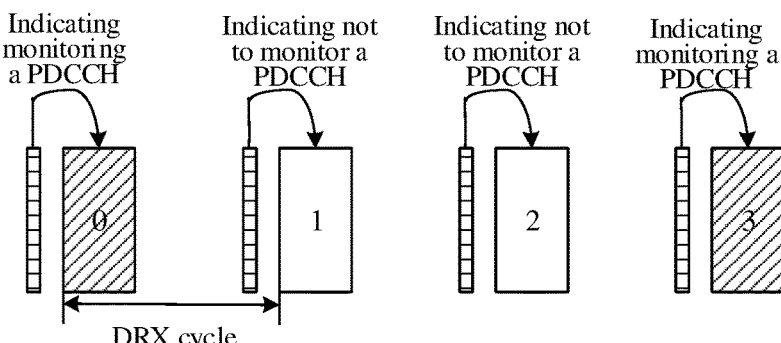
FIG. 1
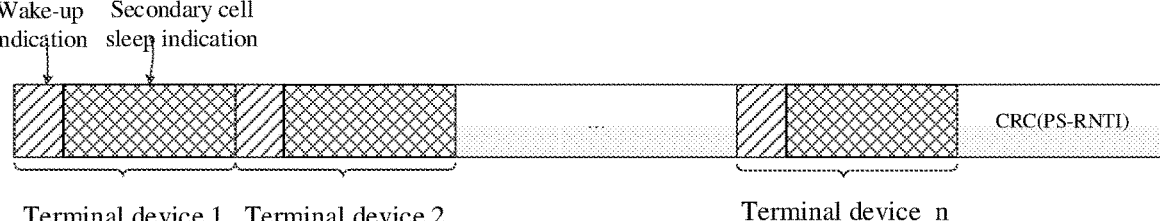
FIG. 2
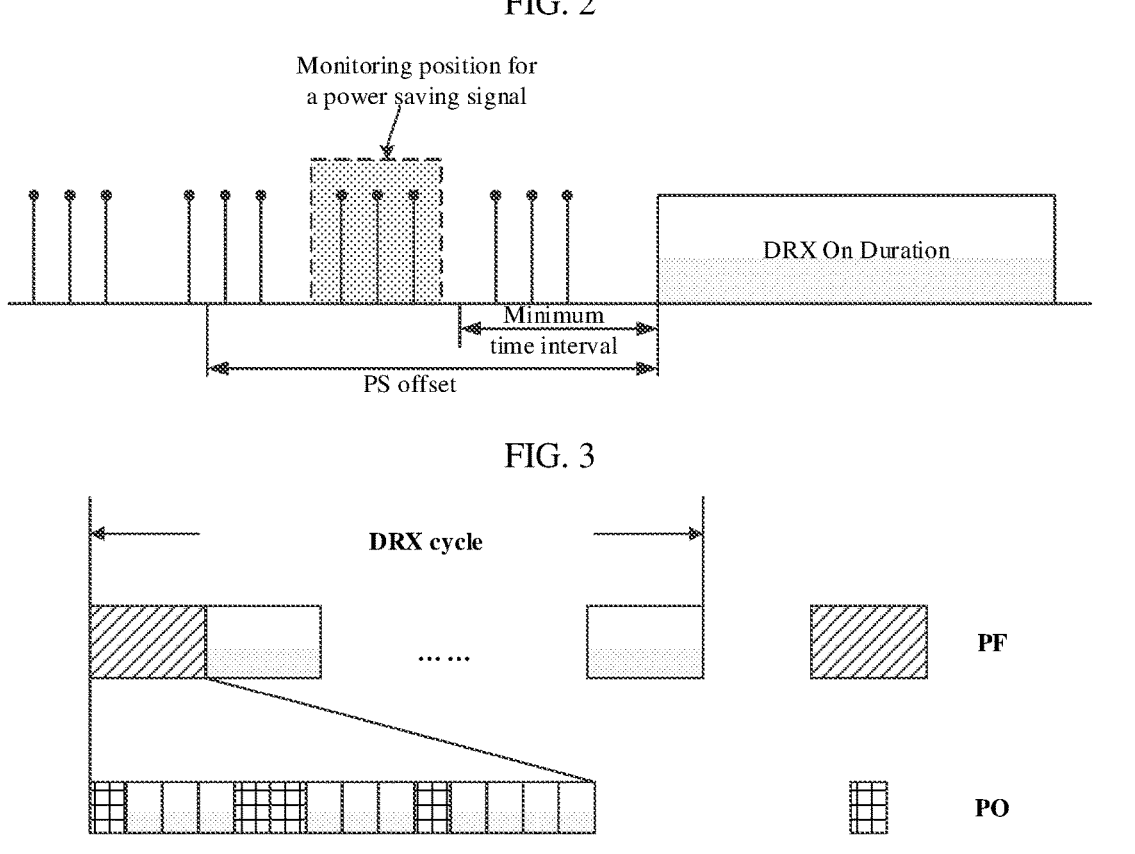
FIG. 3
FIG. 4

100

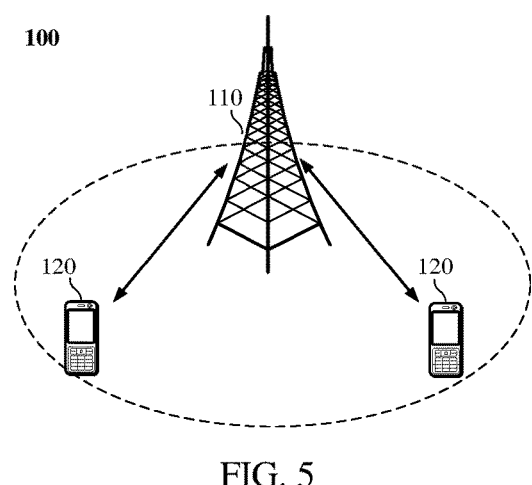

FIG. 5

Receiving, by a terminal device, power saving indication information in a first search space set, the power saving indication information indicating whether the terminal device needs to receive a paging message in a target paging occasion group or a target paging frame group          S201

FIG. 6

Monitoring occasion for power saving indication information (one On Duration in a PDCCH search space)

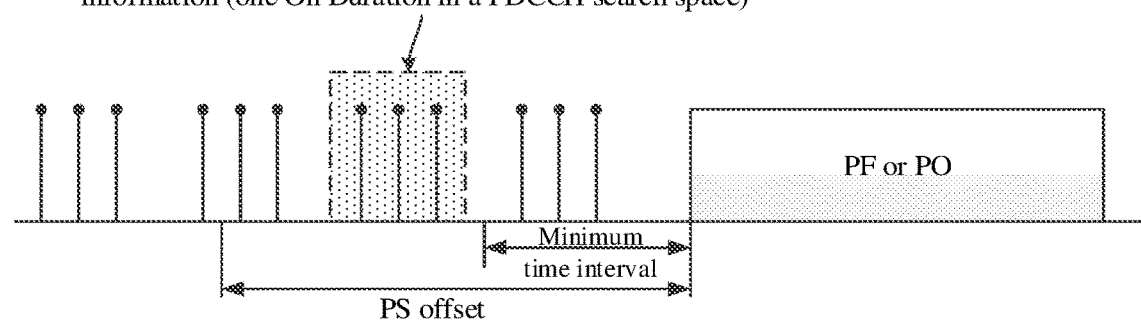

PF or PO

Minimum time interval

PS offset

FIG. 7

Transmitting, by a network device, power saving indication information in a first search space set, the power saving indication information indicating whether a terminal device needs to receive a paging message in a target paging occasion group or a target paging frame group          S301

FIG. 8

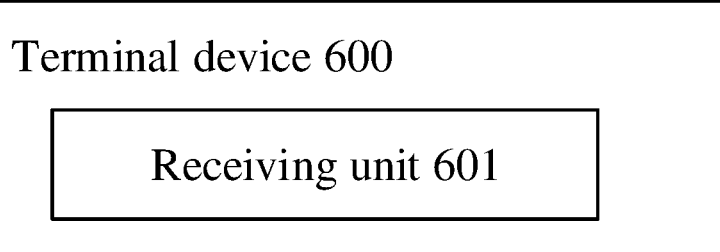
FIG. 16
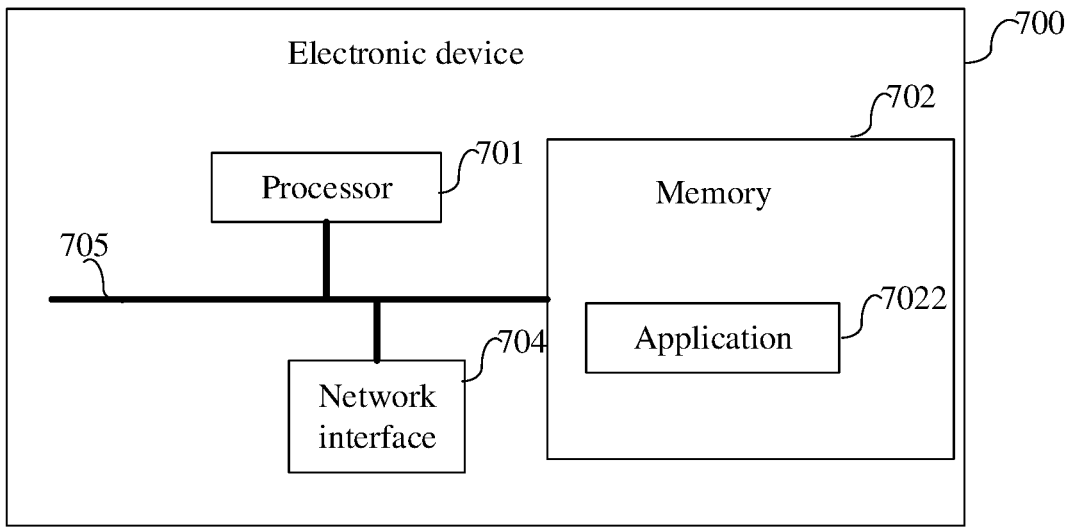
FIG. 17
FIG. 18

PAGING INDICATION METHOD, ELECTRONIC DEVICE, AND STORAGE MEDIUM

CROSS-REFERENCE TO RELATED APPLICATIONS

This application is a continuation of International Application No. PCT/CN2020/107935 entitled "PAGING INDI-CATION METHOD, ELECTRONIC DEVICE, AND STORAGE MEDIUM" filed on Aug. 7, 2020, which is incorporated herein by reference.

FIELD

The present disclosure relates to the field of wireless communication technologies, and more particularly, to a paging indication method, an electronic device, and a storage medium.

BACKGROUND

With the introduction of power saving in a User Equipment (UE), transmission of paging messages has been the goal of power saving technology.

SUMMARY

Embodiments of the present disclosure provide a paging indication method, an electronic device, and a storage medium, capable of identifying an occasion for a terminal device to receive a paging message.

In a first aspect, according to an embodiment of the present disclosure, a paging indication method is provided. The paging indication method includes: receiving, by a terminal device, power saving indication information in a first search space, the power saving indication information indicating whether the terminal device needs to receive a paging message in a current paging occasion or a current paging frame.

In a second aspect, according to an embodiment of the present disclosure, a paging indication method is provided. The paging indication method includes: transmitting, by a network device, power saving indication information in a first search space set, the power saving indication information indicating whether a terminal device needs to receive a paging message in a target paging occasion group or a target paging frame group.

In a third aspect, according to an embodiment of the present disclosure, a terminal device is provided. The terminal device includes a receiving unit. The receiving unit is configured to receive power saving indication information in a first search space set, the power saving indication information indicating whether the terminal device needs to receive a paging message in a target paging occasion group or a target paging frame group.

In a fourth aspect, according to an embodiment of the present disclosure, a network device is provided. The network device includes a transmitting unit. The transmitting unit is configured to transmit power saving indication information in a first search space set, the power saving indication information indicating whether a terminal device needs to receive a paging message in a target paging occasion group or a target paging frame group.

In a fifth aspect, according to an embodiment of the present disclosure, a terminal device is provided. The terminal device includes a processor, and a memory for storing a computer program executable on the processor. The processor is configured to execute the computer program to perform the steps of the paging indication method performed by the terminal device.

In a sixth aspect, according to an embodiment of the present disclosure, a network device is provided. The network device includes a processor, and a memory for storing a computer program executable on the processor. The processor is configured to execute the computer program to perform the steps of the paging indication method performed by the network device.

In a seventh aspect, according to an embodiment of the present disclosure, a chip is provided. The chip includes a processor. The processor is configured to invoke and execute a computer program from a memory to cause an apparatus provided with the chip to perform the paging indication method performed by the terminal device.

In an eighth aspect, according to an embodiment of the present disclosure, a chip is provided. The chip includes a processor. The processor is configured to invoke and execute a computer program from a memory to cause an apparatus provided with the chip to perform the paging indication method performed by the network device.

In a ninth aspect, according to an embodiment of the present disclosure, a storage medium is provided. The storage medium stores an executable program. The executable program, when executed by a processor, implements the paging indication method performed by the terminal device.

In a tenth aspect, according to an embodiment of the present disclosure, a storage medium is provided. The storage medium stores an executable program. The executable program, when executed by a processor, implements the paging indication method performed by the network device.

In an eleventh aspect, according to an embodiment of the present disclosure, a computer program product is provided. The computer program product includes computer program instructions. The computer program instructions cause a computer to perform the paging indication method performed by the terminal device.

In a twelfth aspect, according to an embodiment of the present disclosure, a computer program product is provided. The computer program product includes computer program instructions. The computer program instructions cause a computer to perform the paging indication method performed by the network device.

In a thirteenth aspect, according to an embodiment of the present disclosure, a computer program is provided. The computer program causes a computer to perform the paging indication method performed by the terminal device.

In a fourteenth aspect, according to an embodiment of the present disclosure, a computer program is provided. The computer program causes a computer to perform the paging indication method performed by the network device.

According to the embodiments of the present disclosure, the paging indication method, the electronic device, and the storage medium are provided. The paging indication method includes: receiving, by the terminal device, the power saving indication information in the first search space. The power saving indication information indicates whether the terminal device needs to receive the paging message in the current paging occasion or the current paging frame. In this way, an occasion for the terminal device to receive the paging message is determined, which avoids a detection of the paging message by the terminal device at an occasion when no paging message is transmitted, thereby saving power of the terminal device.

BRIEF DESCRIPTION OF DRAWINGS

FIG. 1 is a schematic diagram showing instructing, by means of a power saving signal, a terminal device whether to monitor a Physical Downlink Control Channel (PDCCH) in a Discontinuous Reception (DRX) On Duration according to an embodiment of the present disclosure.

FIG. 2 is a schematic diagram showing a power saving signal carrying power saving indication information for a plurality of terminal devices according to an embodiment of the present disclosure.

FIG. 3 is a schematic diagram showing a monitoring occasion for a terminal device to monitor a power saving signal according to an embodiment of the present disclosure.

FIG. 4 is a schematic diagram showing positions of a Paging Frame (PF) and a Paging Occasion (PO) during one DRX cycle according to an embodiment of the present disclosure.

FIG. 5 is a schematic diagram showing a composition structure of a communication system according to an embodiment of the present disclosure.

FIG. 6 is a flowchart illustrating an optional processing of a paging indication method according to an embodiment of the present disclosure.

FIG. 7 is a schematic diagram showing a monitoring occasion, determined based on a PO or a PF, for monitoring a power saving signal according to an embodiment of the present disclosure.

FIG. 8 is another flowchart illustrating an optional processing of a paging indication method according to an embodiment of the present disclosure.

FIG. 16 is a schematic diagram showing an optional composition structure of a terminal device according to an embodiment of the present disclosure.

FIG. 17 is a schematic diagram showing an optional composition structure of a network device according to an embodiment of the present disclosure.

FIG. 18 is a schematic diagram showing a hardware composition structure of an electronic device according to an embodiment of the present disclosure.

DESCRIPTION OF EMBODIMENTS

Figures 9, 10, 11, 12:
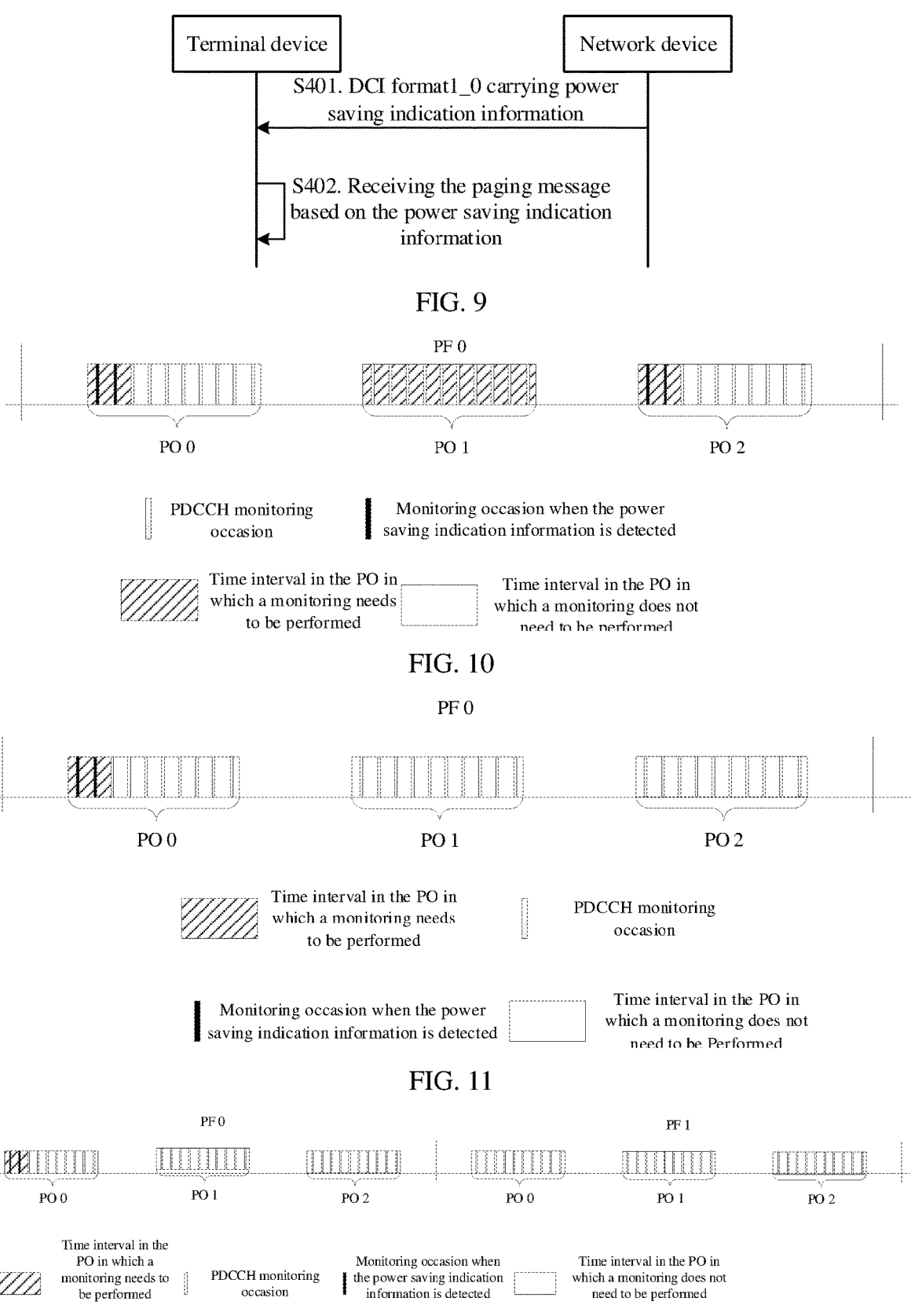
FIG. 9 is a flowchart illustrating a detailed processing of a paging indication method according to an embodiment of the present disclosure.
FIG. 10 is a schematic diagram showing a terminal device receiving a paging message according to an embodiment of the present disclosure.
FIG. 11 is another schematic diagram showing a terminal device receiving a paging message according to an embodiment of the present disclosure.
FIG. 12 is yet another schematic diagram showing a terminal device receiving a paging message according to an embodiment of the present disclosure.

To provide a more detailed understanding of features and technical content of embodiments of the present disclosure, implementations of the embodiments of the present disclosure will be described in detail below with reference to the accompanying drawings. The accompanying drawings are for reference and description only, and are not intended to limit the embodiments of the present disclosure.

Before description of the embodiments of the present disclosure, a brief description will be made to relevant content.

To save power in a terminal device, both a Long Term Evolution (LTE) system and a New Radio (NR) system have a DRX mechanism. With the DRX mechanism, the terminal device does not have to keep a receiver in on state all the time in a case of no data reception, and instead enters a DRX state, thereby achieving power saving of the terminal device. The DRX mechanism includes configuring a DRX cycle for a terminal in a Radio Resource Control connected (RRC_CONNECTED) state. One DRX cycle consists of On Duration and Opportunity for DRX. During On Duration of the DRX cycle, the terminal device monitors and receives downlink channels including a PDCCH and signals. During Opportunity for DRX, the terminal device does not receive downlink channels such as the PDCCH and signals to reduce power consumption. In an RRC idle (RRC_idle) state, the terminal device needs to receive paging messages in a similar way to DRX. One Paging Occasion (PO) exists in each DRX cycle. The terminal device only receives paging messages on the PO, and does not receive paging messages at time periods outside of the PO, aiming to achieve power saving. The terminal device determines whether a paging message is available by detecting a PDCCH signal scrambled with a Paging Radio Network Temporary Identity (P-RNTI) on the PO.

The evolution of the NR system has placed greater demands on power saving of the terminal device. For example, for a conventional DRX mechanism, during each On Duration, the terminal device needs to constantly detect the PDCCH to determine whether a network device schedules data transmission transmitted to itself. However, for most terminal devices, although they may not need to receive data transmission for a long period of time, they still need to maintain a regular wake-up mechanism to monitor possible downlink transmission. Therefore, there is room for further optimization of power saving for such terminal devices. The same is true for a case where the terminal device in the RRC_idle state receives the paging message.

In Release-16 (R16), a power saving signal has been introduced to further realize power saving in terminal devices. The power saving signal is used in conjunction with the DRX mechanism. The terminal device receives an indication of a power saving wake-up signal before the DRX On Duration. When the terminal device has data transmission during a DRX cycle, the power saving wake-up signal "wakes up" the terminal to monitor the PDCCH during the DRX On Duration; otherwise, when the terminal device has no data transmission during a DRX cycle, the power saving wake-up signal does not "wake up" the terminal, and therefore the terminal does not need to monitor the PDCCH during the DRX On Duration. Compared with the conventional DRX mechanism, the terminal device can omit PDCCH monitoring during the DRX On Duration in a case where the terminal device has no data transmission, thereby realizing power saving of the terminal device. Time when the terminal device is outside the DRX On Duration is called inactive time and time during the DRX On Duration is called active time. A process of instructing, by means of the power saving signal, the terminal device whether to monitor the PDCCH during the DRX On Duration is illustrated in FIG. 1. When the power saving signal indicates monitoring a PDCCH, the PDCCH is monitored during the DRX cycle; or when the power saving signal indicates not to monitor a PDCCH, the PDCCH is not monitored during the DRX cycle.

In R16, the power saving signal is carried in a newly-defined Downlink Control Information (DCI) format 2_6. The network device configures a search space set in which the terminal device detects a PDCCH carrying the DCI format 2_6. Each terminal device requires a power saving signal having a maximum of six bits, including one wake-up indication bit and up to five secondary cell sleep indication bits. The power saving signal can carry indication bits for a plurality of terminal devices to improve efficiency of resource usage within a system. A schematic diagram showing a power saving signal carrying power saving indication information for a plurality of terminal devices is illustrated in FIG. 2. The network device informs each terminal device of a starting position of bits of the power saving indication information in the DCI. A number of bits for each terminal device may be obtained implicitly from a configured number of secondary cell (carrier) groupings. A number of bits for a wake-up indication must not be zero and a number of bits for a secondary cell (carrier) sleep indication can be zero. Further, the network device may also inform the terminal device of a total number of bits of DCI and a Power Saving Radio Network Temporary Identity (PS-RNTI) scrambling a PDCCH.

A monitoring occasion of the PDCCH is relevant to a time window of the DRX On Duration. The network device configures a time offset (e.g., PS-offset) which is used to determine a starting point of the PDCCH monitoring occasion. After the starting point of the PDCCH monitoring occasion has been determined, an end point of PDCCH monitoring needs to be further determined. The end point of the PDCCH monitoring is determined based on a capability of the terminal device. The terminal device needs to perform operations such as device wake-up and initialization after wake-up during a minimum time interval before the DRX On Duration. Therefore, the terminal device does not need to monitor the power saving wake-up signal during the minimum time interval before the DRX On Duration. For a terminal device having a fast processing speed, a short minimum time interval may be used, e.g., "value 1" as shown in Table 1 below; and for a terminal device having a slow processing speed, a long minimum time interval may be used, e.g., "value 2" as shown in Table 1 below.

TABLE 1

| Minimum time interval | | |
| --- | --- | --- |
| Subcarrier | Minimum time interval (slots) | |
| spacing (kHz) | Value 1 | Value 2 |
| 15 | 1 | 3 |
| 30 | 1 | 6 |
| 60 | 1 | 12 |
| 120 | 2 | 24 |

A starting point of the power saving signal is a time position indicated by the PS-offset configured by the network device. The power saving signal is monitored within one complete search space cycle of the PDCCH (defined by a parameter "duration" of the search space of the PDCCH) after this starting point. A position of the monitored power saving signal is before a time period corresponding to the minimum time interval. The monitoring occasion for the terminal device to monitor the power saving signal, identified by a dashed box, is as illustrated in FIG. 3.

In the NR system, the network device can transmit a paging message to both a terminal device in an idle state and a terminal device in a connected state. A paging process can be triggered by a core network or a network device to transmit a paging request to the terminal device in the idle state, or to notify a terminal device of a system information update, or to notify a terminal device of at least one of Earthquake and Tsunami Warning System (ETWS) information or Commercial Mobile Alert Service (CMAS) information, etc. After receiving the paging message from the core network, the network device parses content of the paging message, obtains a Tracking Area Identity (TAI) list of the terminal device, and performs air interface paging on a cell in a tracking area belonging to a TA list. A core network domain of the paging message, instead of being decoded in the network device, is transmitted to the terminal device in a pass-through manner. After receiving the paging message from the core network, the network device aggregates paging messages on a same PO of the terminal device into a single paging message and transmits the single paging message to the relevant terminal device through a paging channel. By receiving a paging parameter through a system message, the terminal device can determine positions of a common paging frame and a PO of a cell, and calculate, based on its own terminal device identity (UE_ID), positions of its paging frame and PO to receive the paging message at corresponding time. The paging message is carried on a Physical Downlink Shared Channel (PDSCH). The terminal device obtains paging indication information by means of detecting the PDCCH scrambled with the P-RNTI, and therefore receives the paging message. The terminal device in the idle state may save power by means of DRX and obtain DRX relevant information from a System Information Block2 (SIB2). The paging message is received through monitoring the PDCCH scrambled with the P-RNTI on the PO of the PF in one DRX cycle.

The PF represents a System Frame Number (SFN) in which the paging message appears, and the PO represents a time point at which the paging message may appear. One PF frame may include one or more POs. In each DRX cycle or paging cycle, the terminal device only needs to monitor the PO that belongs to it. An SFN of the PF satisfying the following formula may be used as a PF.

The SFN of the PF is determined by the following formula of:

$$(SFN+PF\_\text{offset})\bmod T = (T \text{ div } N)*(UE\_ID \bmod N) \tag{1}$$

Index_(i_s) of POs located within a same PF are determined by the following formula of:

$$i\_s = \text{floor}(UE\_ID/N)\bmod Ns \tag{2}$$

In the above formulas, T represents a DRX cycle for the terminal device to receive paging. The network device may broadcast a default DRX cycle (T_sib). When the network device has configured an exclusive DRX cycle (T_ue) for the terminal device through RRC signaling/higher-layer signaling, a smaller one of the DRX cycle broadcast by the network device and the exclusive DRX cycle for the terminal device configured through the RRC signaling/higher-layer signaling may be determined as the DRX cycle of the terminal device, i.e., T=min (T_sib, T_ue). When the network device does not configure any exclusive DRX cycle for the terminal device through the RRC signaling/higher-layer signaling, the DRX cycle broadcast by the network device is determined as the DRX cycle for the UE. N represents a number of PFs contained in one DRX cycle. Ns represents a number of POs contained in one PF. PF-offset represents a time domain offset used to determine the PF. UE_ID represents 5G-S-TMSI mod 1024. Positions of the PF and the PO during one DRX cycle are as illustrated in FIG. 4.

For a PDCCH search space set, in the NR system, the network device indicates the PDCCH search space set for the terminal device to instruct the terminal device to detect the PDCCH on a corresponding time-frequency resource. A PDCCH search space is generally notified to the terminal device by the network device through the RRC signaling. Configuration information of the search space set may contain the following information:

(1) a search space identity (search space ID);

(2) a control resource set identity (control ResourceSet Id), which indicates an ID of a configuration of a control resource set to configure a time-frequency resource of the PDCCH search space;

(3) a cycle of monitored slots and an offset within the cycle; cycles currently supported by the NR include 1, 2, 4, 5, 8, 10, 16, 20, 40, 80, 160, 320, 640, 1280, or 2560 slots;

(4) Duration, which indicates a number of consecutively-monitored slots during a PDCCH search space cycle;

(5) monitoringSymbolsWithinSlot indicating symbols within slots for PDCCH monitoring, in which the PDCCH monitoring is performed;

(6) PDCCH candidates, which indicate configuration information of PDCCH candidates; and (7) Search space type indicating whether the PDCCH search space is a common search space or a UE-specific search space, and DCI format indicating a DCI format of monitoring under each type.

In summary, for the terminal device in the idle state, its main power consumption lies in cyclic reception of paging messages. However, a way to transmit the power saving signal to the terminal device in the idle state, and a format, a composition, and an indication manner of the power saving indication information carrying the power saving signal have not been determined.

The technical solutions according to the embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, an Advanced Long Term Evolution (LTE-A) system, an NR system, an evolution system of the NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, a Wireless Local Area Network (WLAN), Wireless Fidelity (WiFi), a next-generation of communication system, or other communication systems, etc.

The system architecture and business scenarios described in the embodiments of the present disclosure are intended to illustrate the technical solutions of the embodiments of the present disclosure more clearly and do not constitute a limitation of the technical solutions provided in the embodiments of the present disclosure. It is conceivable for those skilled in the art that the technical solutions provided in the embodiments of the present disclosure are equally applicable to similar technical problems as the network architecture evolves and new business scenarios emerge.

The network device involved in the embodiments of the present disclosure can be an ordinary base station (e.g., NodeB or eNB or gNB), an NR controller, a centralized unit, an NR base station, a radioremote module, a micro base station, a relay, a distributed unit, a Transmission Reception Point (TRP), a Transmission Point (TP), or any other device. The embodiments of the present disclosure do not limit a specific technology or device form adopted for the network device. For ease of description, in all embodiments of the present disclosure, the above-mentioned devices that provide a wireless communication function for the terminal device are collectively referred to as the network device.

In the embodiments of the present disclosure, the terminal device can be any terminal. For example, the terminal device may be a User Equipment (UE) for Machine Type Communication (MTC). That is, the terminal device may also be called a UE, a Mobile Station (MS), a mobile terminal, a terminal, etc. The terminal device may communicate with one or more core networks via a Radio Access Network (RAN). For example, the terminal device may be a mobile phone (or a "cellular" phone), a computer including a mobile terminal, etc. For example, the terminal device may also be a portable, pocket-sized, handheld, computer-built or vehicle-mounted mobile device that exchanges language and/or data with the RAN. The embodiments of the present disclosure are not limited to any of these examples.

Optionally, each of the network device and the terminal device may be deployed on land, including indoors or outdoors, a handheld manner, or a vehicle-mounted manner; on water; or on an aircraft, a balloon, or an artificial satellite in the air. Application scenarios of the network device and the terminal device are not limited by any of the embodiments of the present disclosure.

Optionally, communication between the network device and the terminal device and between terminal devices may be performed via a licensed spectrum, or an unlicensed spectrum, or both the licensed spectrum and the unlicensed spectrum. The communication between the network device and the terminal device and between the terminal devices may be performed via a spectrum below 7 gigahertz (GHz), or a spectrum above 7 GHz, or both the spectrum below 7 GHz and the spectrum above 7 GHz. The embodiments of the present disclosure do not limit spectrum resources used in the communication between the network device and the terminal device.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, MTC, and Vehicle to Vehicle (V2V) communication, etc. The embodiments of the present disclosure can also be applied to these communication systems.

Exemplarily, a communication system 100 applied in an embodiment of the present disclosure is as illustrated in FIG. 5. The communication system 100 may include a network device 110. The network device 110 may be a device that communicates with a terminal device 120 (or called a communication terminal or a terminal). The network device 110 may provide communication coverage for a specific geographic region, and may communicate with a terminal device located in the coverage region. Optionally, the network device 110 may be a base station such as Base Transceiver Station (BTS) in a GSM system or a CDMA system, a base station such as NodeB (NB) in a WCDMA system, a base station such as Evolutional Node B (eNB or eNodeB) in an LTE system, or a wireless controller in a Cloud Radio Access Network (CRAN). Alternatively, the network device can be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage region of the network device 110. The "terminal device" used herein includes, but is not limited to, a device configured to receive/transmit a communication signal via a wired line connection, such as a Public Switched Telephone Network (PSTN), a Digital Subscriber Line (DSL), a digital cable, a direct cable connection, and/or via another data connection/ network, and/or via a wireless interface, for example, for a cellular network, a Wireless Local Area Network (WLAN), a digital television network such as a Digital Video Broadcasting Handheld (DVB-H) network, a satellite network, and an Amplitude Modulation-Frequency Modulation (AM-FM) broadcast transmitter, and/or via another terminal device; and/or an Internet of Things (IoT) device. A terminal device configured to communicate through the wireless interface may be referred to as a "wireless communication terminal", a "wireless terminal", or a "mobile terminal". Examples of the mobile terminal include but are not limited to, a satellite or a cellular phone, a Personal Communication System (PCS) terminal that may combine a cellular radiotelephone with capabilities such as data processing, facsimile and data communication, a Personal Digital Assistant (PDA) that may include a radiotelephone, a pager, an Internet/intranet access, a Web browser, a notepad, a calendar, and/or a Global Positioning System (GPS) receiver, and a conventional laptop and/or palmtop receiver, or other electronic devices including a radiotelephone transceiver. The terminal device can refer to an access terminal, a User Equipment (UE), a user unit, a user station, a mobile station, a mobile platform, a remote station, a remote terminal, a mobile device, a user terminal, a terminal, a wireless communication device, a user agent, or a user device. The access terminal can be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, a vehicle-mounted device, a wearable device, a terminal device in a 5G network, or a terminal device in the future evolved PLMN, etc.

Optionally, direct communication, such as Device to Device (D2D) communication, may be performed between the terminal devices 120.

Optionally, the 5G system or the 5G network may also be referred to as an NR system or an NR network.

FIG. 5 exemplarily illustrates one network device and two terminal devices. Optionally, the communication system 100 may include a plurality of network devices, and coverage of each network device may include a different number of terminal devices. The embodiments of the present disclosure are not limited to any of these examples.

Optionally, the communication system 100 may also include other network entities such as a network controller and a mobility management entity, and the embodiment of the present disclosure is not limited to any of these examples.

It should be understood that, in the embodiment of the present disclosure, a device having a communication function in a network/system may be referred to as a communication device. Taking the communication system 100 shown in FIG. 5 as an example, communication devices may include the network device 110 and the terminal devices 120, each having a communication function. The network device 110 and the terminal device 120 may be any specific devices described above, and details thereof will be omitted here. The communication device may also include another device in the communication system 100, for example other network entities such as a network controller, a mobility management entity, etc., and embodiments of the present disclosure are not limited to any of these examples.

An optional processing of a paging indication method according to an embodiment of the present disclosure is as illustrated in FIG. 6 and includes an action at block S201.

At block S201, a terminal device receives power saving indication information in a first search space set. The power saving indication information indicates whether the terminal device needs to receive a paging message in a target paging occasion group or a target paging frame group.

In some embodiments, the terminal device receives the power saving indication information transmitted by the network device in the first search space set. The target paging occasion group indicated by the power saving indication information may be a paging occasion group of the terminal device or a common paging occasion group. The target paging frame group indicated by the power saving indication information may be a paging frame group of the terminal device or a common paging frame group. The target paging occasion group includes at least one paging occasion. The target paging frame group includes at least one paging frame.

In some embodiments, the target paging occasion group or the target paging frame group may be predefined; or the target paging occasion group or the target paging frame group is pre-configured; or the target paging occasion group or the target paging frame group is configured via signaling. For example, the target paging occasion group or the target paging frame group is configured via paging configuration information.

In some embodiments, the first search space set may be a common search space set. The first search space set may be an existing search space set for receiving paging indication information (e.g., Type2-PDCCH CSS set), or an existing Type0-PDCCH CSS set, or an existing Type0A-PDCCH CSS set, or an existing Type1-PDCCH CSS set. In a case where the first search space set is an existing search space set, the paging indication information is added to information transmitted in the first search space set. Alternatively, the first search space set may be a new search space set different from the existing Type0-PDCCH CSS set, Type0A-PDCCH CSS set, Type1-PDCCH CSS set and Type2-PDCCH CSS set. The new search space set may be used for transmitting the power saving indication information only.

In some embodiments, the power saving indication information is carried in first DCI. The first DCI is DCI in a format 1-0 and scrambled with a P-RNTI, i.e., DCI format 1-0.

In this scenario, short message indication information of the first DCI and/or bit information corresponding to short message information may indicate whether the terminal device needs to receive the paging message in the target paging occasion group or the target paging frame group. The short message indication information of the first DCI may further indicate that the first DCI carries the power saving indication information.

In some embodiments, the power saving indication information is carried in second DCI. The second DCI is DCI in a format 2-6 and scrambled with a PS-RNTI, i.e., DCI format 2-6.

In this scenario, wake-up indication bit information of the second DCI indicates whether the terminal device needs to receive the paging message in the target paging occasion group or the target paging frame group. Secondary cell sleep indication bit information of the second DCI may further indicate the target paging occasion group or the target paging frame group.

The above description is made with respect to the use of bit information to indicate whether the terminal device needs to receive the paging message in the target paging occasion group or the target paging frame group. Alternatively, in a specific implementation, a bitmap may indicate whether the terminal device needs to receive the paging message in the target paging occasion group or the target paging frame group. Bit information of each bit in the bitmap indicates whether reception of the paging message in a paging occasion group or a paging frame group corresponding to the bit is needed. For example, each bit in the bitmap corresponds to a paging occasion group or a paging frame group. When bit information of a bit is of a first value (e.g., 0), the terminal device is instructed not to receive the paging message in the paging occasion group or the paging frame group corresponding to the bit; and when the bit information of the bit is of a second value (e.g., 1), the terminal device is instructed to receive the paging message in the paging occasion group or the paging frame group corresponding to the bit. Of course, alternatively, it may be that when the bit information of the bit is of the first value (e.g., 1), the terminal device is instructed not to receive the paging message in the paging occasion group or the paging frame group corresponding to the bit; and when the bit information of the bit is of the second value (e.g., 0), the terminal device is instructed to receive the paging message in the paging occasion group or the paging frame group corresponding to the bit.

For example, one PF includes a plurality of POs, and the network device transmits the power saving indication information on a first PO of the plurality of POs within the PF. After the terminal device in a cell receives the power saving indication information, in a case where the power saving indication information indicates that no paging message exists, the terminal device determines that none of the POs other than the first PO within the PF or one or more PFs following the PF has the paging message. It should be understood that the target paging occasion group indicated by the power saving indication information may be one or more paging occasions, and the target paging frame group indicated by the power saving indication information may be one or more paging frames.

In some embodiments, when the first search space set is a search space set for receiving the power saving indication information only, a monitoring occasion for the power saving indication information to be received by the terminal device in the first search space set is determined based on a paging occasion or a paging frame. The paging frame may belong to the terminal device or may be a common paging frame configured by the cell. The paging occasion may belong to the terminal device or may be a common paging occasion configured by the cell. The monitoring occasion of the power saving indication information includes On Duration, prior to one paging frame or PO, of a complete search space for a PDCCH between a configured time offset and a minimum time interval. As illustrated in FIG. 7, within a time offset prior to the PO or the PF, On Duration in the search space of the PDCCH at a minimum time interval from the PO or PF is the monitoring occasion of the power saving indication information.

In some embodiments, the terminal device receives the power saving indication information on the monitoring occasion as shown in FIG. 7, or may receive no power saving indication information at time points other than the monitoring occasion shown in FIG. 7, or may receive the power saving indication information at a part of the time points other than the monitoring occasion shown in FIG. 7.

In the embodiments of the present disclosure, the monitoring occasion of the power saving indication information is determined based on the PO or the PF, instead of DRX On Duration. In this way, transmission and reception of the power saving indication information can better match time when the terminal device actually receives the paging message, and a better power saving effect can be achieved.

Another flowchart illustrating an optional processing of a paging indication method according to an embodiment of the present disclosure is as illustrated in FIG. 8, and includes an action at block S301.

At block S301, a network device transmits power saving indication information in a first search space set. The power saving indication information indicates whether a terminal device needs to receive a paging message in a target paging occasion group or a target paging frame group.

In some embodiments, the network device transmits the power saving indication information to the terminal device in the first search space set.

In some embodiments, description of the power saving indication information, the first search space set, the target paging occasion group, and the target paging frame group is the same as the description made to the action at block S201, and will not be repeated here.

A specific implementation of the paging indication method according to the embodiments of the present disclosure is described in detail below in combination with different formats of the DCI carrying the power saving indication information and different first search spaces.

Taking the DCI carrying the power saving indication information as DCI format 1-0 as an example, a flowchart illustrating a detailed processing of the paging indication method according to an embodiment of the present disclosure is as illustrated in FIG. 9 and includes actions at blocks S401 and S402.

At block S401, the terminal device receives DCI format 1_0 carrying the power saving indication information transmitted by the network device in the first search space set.

In some embodiments, the first search space set is an existing search space set (e.g., Type2-PDCCH CSS set) for receiving the paging indication information. Type2-PDCCH indicates scheduling information for a PDSCH carrying the paging message. A Type2-PDCCH search space may be configured via RRC (e.g., pagingSearchSpace) signaling. Information for configuring the Type2-PDCCH search space may be carried in a system message or in dedicated signaling and is used to receive the paging message on an active Bandwidth Part (BWP).

In this scenario, DCI format 1-0 scrambled with the P-RNTI may be used to carry the power saving indication information. That is, the power saving indication information is carried in DCI format 1-0 scrambled with the P-RNTI. In the related art, since the terminal device needs to detect DCI format 1-0 scrambled with the P-RNTI on the monitoring occasion of the PDCCH, the terminal device needs to further receive the PDSCH after detecting DCI format 1-0 scrambled with the P-RNTI to determine whether a paging message belonging to the terminal device exists. In contrast, in the embodiments of the present disclosure, by allowing DCI format 1-0 scrambled with the P-RNTI to carry the power saving indication information, it is unnecessary for the terminal device to further receive the PDSCH after receiving the power saving indication information. Instead, the terminal device can determine whether a paging message belonging to the terminal device exists by allowing DCI format 1-0 scrambled with the P-RNTI to carry the power saving indication information, thereby achieving power saving.

Here, detailed description is made by taking the first search space set being Type2-PDCCH CSS as an example. Alternatively, in a specific implementation, the first search space set may be the existing Type0-PDCCH CSS set, or the existing Type0A-PDCCH CSS set, or the existing Type1-PDCCH CSS set, etc., just to name a few.

In this way, the use of the existing search space set for transmission of the power saving indication information can increase resource utilization of the control channel and present good backward compatibility. By adding the power saving indication information to the existing configuration information, the terminal device is informed whether the paging message needs to be received before an arrival of its own PO, which can not only save signaling overhead, but also avoid power consumption resulted from detecting the paging message on an occasion having no paging message. Therefore, a power saving gain can be increased.

In other embodiments, the first search space set is a search space set for receiving the power saving indication information only. The search space set for receiving the power saving indication information only is a new search space set that is different from the existing Type0-PDCCH CSS set, Type0A-PDCCH CSS set, Type1-PDCCH CSS set, or Type2-PDCCH CSS set.

Here, for Type0-PDCCH CSS set: type0-PDCCH indicates scheduling information for a PDSCH carrying SIB1, and its search space is indicated via a pdcch-ConfigSIB1 information field in Master Information Block (MIB) information for a UE to receive SIB1 at an initial access. After the UE receives SIB1, this CSS may also be configured via the RRC signaling. Cyclic Redundancy Check (CRC) of a DCI format corresponding to Type0-PDCCH is scrambled with the SI-RNTI.

For Type0A-PDCCH CSS set: type0A-PDCCH indicates scheduling information for a PDSCH carrying OtherSystemInformation, a search space of the type0A-PDCCH is configured via the RRC signaling, and CRC of a DCI format of the type0A-PDCCH is scrambled with the SI-RNTI.

For Type1-PDCCH CSS set: type1-PDCCH indicates scheduling information for a PDSCH carrying RAR, a search space of the type1-PDCCH is configured via the RRC signaling, and CRC of a DCI format of the type1-PDCCH is scrambled with a Random Access (RA)-RNTI, an MsgB-RNTI, or a Temporary Cell (TC)-RNTI.

For Type2-PDCCH CSS set: type2-PDCCH indicates scheduling information for a PDSCH carrying the paging message, a search space of the type2-PDCCH is configured via the RRC signaling, and CRC of a DCI format of the type2-PDCCH is scrambled with the P-RNTI.

With different Common Search Spaces (CSSs), the terminal device may detect the PDCCH on a corresponding PDCCH monitoring occasion based on a control channel resource set of the PDCCH.

In some embodiments, no matter whether the first search space set is the search space set for receiving the power saving indication information only or any of the existing Type0-PDCCH CSS set, Type0A-PDCCH CSS set, Type1-PDCCH CSS set, or Type2-PDCCH CSS set, etc., content carried by DCI format 1_0 carrying the paging indication information and scrambled with the P-RNTI may be of the following forms.

DCI format 1_0 scrambled with the P-RNTI carries short message indication information (2 bits), short message information (8 bits), and scheduling information for a PDSCH carrying the paging message. The short message indication information (also referred to as short message indicator) indicates content carried by the DCI and can be as shown in Table 2 below.

TABLE 2

| Short Message indicator | |
| --- | --- |
| Bit field | Short Message indicator |
| 00 | Reserved |
| 01 | Only scheduling information for the paging information is present in the DCI |
| 10 | Only short message is present in the DCI |
| 11 | Both scheduling information for the paging information and short message are present in the DCI |

In a specific implementation, the reserved bit field may be used to carry the power saving indication information. For example, bit information "00" means that the DCI contains the power saving indication information.

Alternatively, content carried by the DCI is indicated by the short message information. The short message information is set to "10", indicating that the DCI as the short message indicator contains the power saving indication information. Content of the short message information may include, as shown in Table 3 below, a system information update indication, an ETWS and CMAS indication, and an indication to stop monitoring the PDCCH on the PO. The short message information shown in Table 3 may further carry the power saving indication information indicating the target paging occasion group or the target paging frame group. For example, the power saving indication information is carried by at least one of bits 4-8 of the short message information.

TABLE 3

| Short Messages | |
| --- | --- |
| Bit | Short Message |
| 1 | System information update indication (systemInfoModification) If set to 1: indication of a BCCH modification other than SIB6, SIB7 and SIB8 |
| 2 | ETWS and CMAS indication (etwsAndCmasIndication) If set to 1: indication of an ETWS primary notification and/or an ETWS secondary notification and/or a CMAS notification. |
| 3 | Stop paging monitoring (stopPagingMonitoring) If set to 1: stop monitoring PDCCH occasions(s) for paging in this PO |
| 4-8 | Not used in this release of the specification, and shall be ignored by UE if received. |

In some embodiments, the target paging occasion group or the target paging frame group may be indicated by a bitmap. Bit information of each bit in the bitmap indicates whether reception of the paging message in a paging occasion group or a paging frame group corresponding to the bit is needed. For example, when bit information of a first bit is of a first value (e.g., 0), it is indicated that there is no need to detect the paging message in the paging occasion group or the paging frame group corresponding to the first bit; and when the bit information of the first bit is of a second value (e.g., 1), it is indicated that there is a need to detect the paging message in the paging occasion group or the paging frame group corresponding to the first bit. The paging occasion group or the paging frame group corresponding to the first bit may be pre-agreed or pre-configured.

At block S402, the terminal device receives the paging message based on the power saving indication information.

In some embodiments, a schematic diagram showing the terminal device receiving the paging message is as illustrated in FIG. 10. The target paging occasion group indicated by the power saving indication information is a current PO. When detecting the power saving indication information on a PDCCH monitoring occasion of the current PO, the terminal device no longer monitors the PDCCH on the remaining PDCCH monitoring occasions of the current PO. That is, the terminal device does not receive or detect the paging message on the remaining PDCCH monitoring occasions of the current PO.

In other embodiments, another schematic diagram showing the terminal device receiving the paging message is as illustrated in FIG. 11. The target paging frame group indicated by the power saving indication information is a current PF. When detecting the power saving indication information on a PDCCH monitoring occasion of a current PO or the current PF, the terminal device no longer monitors the PDCCH on the remaining PDCCH monitoring occasions of the current PF. That is, the terminal device does not receive or detect the paging message on the remaining PDCCH monitoring occasions of the current PF. Alternatively, the target paging occasion group for the power saving indication information includes one or more POs. When detecting the power saving indication information on the PDCCH monitoring occasion of the current PO or PF, the terminal device does not monitor the PDCCH within the one or more POs included in the target paging occasion group. That is, the terminal device does not receive or detect the paging message within the one or more POs included in the target paging occasion group.

In some other embodiments, yet another schematic diagram showing the terminal device receiving the paging message is as illustrated in FIG. 12. The target paging frame group indicated by the power saving indication information includes two PFs. When detecting the power saving indication information on the PDCCH monitoring occasion of the current PO or PF, the terminal device no longer monitors the PDCCH on the remaining PDCCH monitoring occasions of the current PF or on a next PF. That is, the terminal device does not receive or detect the paging message on the remaining PDCCH monitoring occasions of the current PF or on the next PF.

Figure 13:
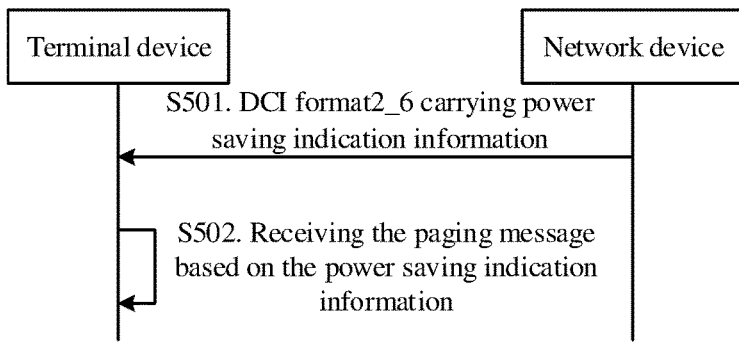
FIG. 13 is another flowchart illustrating a detailed processing of a paging indication method according to an embodiment of the present disclosure.

Taking the DCI carrying the power saving indication information as DCI format 2-6 as an example, another flowchart illustrating a detailed processing of the paging indication method according to an embodiment of the present disclosure is as illustrated in FIG. 13, and includes actions at block S501 and S502.

At block S501, the terminal device receives DCI format 2_6 carrying the power saving indication information transmitted by the network device in the first search space set.

In some embodiments, the first search space set may be an existing search space set (e.g., Type2-PDCCH CSS set) for receiving the paging indication information. Alternatively, the network device may also configure the terminal device to not only receive the power saving indication information in the first search space set but also detect DCI carrying the paging indication information and in the format 1-0 (i.e., DCI format 1-0 scrambled with the P-RNTI).

In this scenario, the terminal device further detects DCI format 2_6 scrambled with the PS-RNTI in the existing first search space set in addition to detecting DCI format 1-0 scrambled with the P-RNTI in the existing first search space set, to obtain the power saving indication information. In this way, the use of the existing search space set for transmission of the power saving indication information can increase resource utilization of the control channel and present good backward compatibility. By adding the power saving indication information to the existing configuration information, the terminal device is informed whether the paging message needs to be received before the arrival of its own PO, which can not only save signaling overhead, but also avoid power consumption resulted from detecting the paging message on an occasion having no paging message. Therefore, the power saving gain can be increased.

In other embodiments, the network device may configure a search space set, i.e., the first search space set, for the terminal device to receive the power saving indication information only by means of the system message, the dedicated signaling, or the like. The first search space set is a new search space set that is different from the existing Type0-PDCCH CSS set, Type0A-PDCCH CSS set, Type1-PDCCH CSS set, and Type2-PDCCH CSS set.

In this scenario, the terminal device receives the power saving indication information in a search space independently configured for receiving the power saving indication information only, which can avoid an impact on the existing paging search space and reduce an influence on receiving the paging message by the terminal device. In addition, with DCI format2_6, an existing power saving signal can be reused, which can reduce complexity of an implementation.

In some embodiments, no matter whether the first search space set is the search space set for receiving the power saving indication information only or any of the existing Type0-PDCCH CSS set, Type0A-PDCCH CSS set, Type1-PDCCH CSS set, or Type2-PDCCH CSS set, etc., content carried by DCI format 2_6 carrying the paging indication information and scrambled with the RS-RNTI may be of the following forms.

Wake-up indication bit information in DCI format 2_6 scrambled with the PS-RNTI may indicate whether the terminal device needs to receive the paging message in the target paging occasion group or the target paging frame group. Secondary cell sleep indication bit information in DCI format 2_6 scrambled with the PS-RNTI may indicate the target paging occasion group or the target paging frame group. For example, a value of 1 for the secondary cell sleep indication bit information in DCI format 2_6 scrambled with the PS-RNTI indicates that the target paging occasion group is the current PO, and a value of 0 for the wake-up indication bit information in DCI format 2_6 scrambled with the PS-RNTI indicates that no paging message is received in the target paging occasion group. Therefore, the terminal device does not monitor the PDCCH on the remaining PDCCH monitoring occasions of the current PO. That is, the terminal device does not receive or detect the paging message on the remaining PDCCH monitoring occasions of the current PO.

At block S502, the terminal device receives the paging message based on the power saving indication information.

Figure 14:
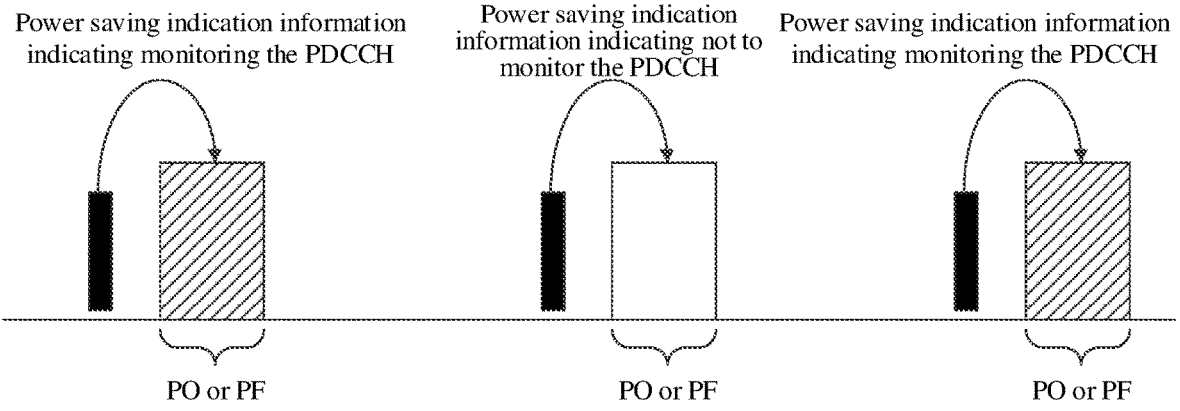
FIG. 14 is still yet another schematic diagram showing a terminal device receiving a paging message according to an embodiment of the present disclosure.

In some embodiments, still yet another schematic diagram showing the terminal device receiving the paging message is as illustrated in FIG. 14. The power saving indication information may indicate whether the paging message is received on one PO or PF.

Figure 15:
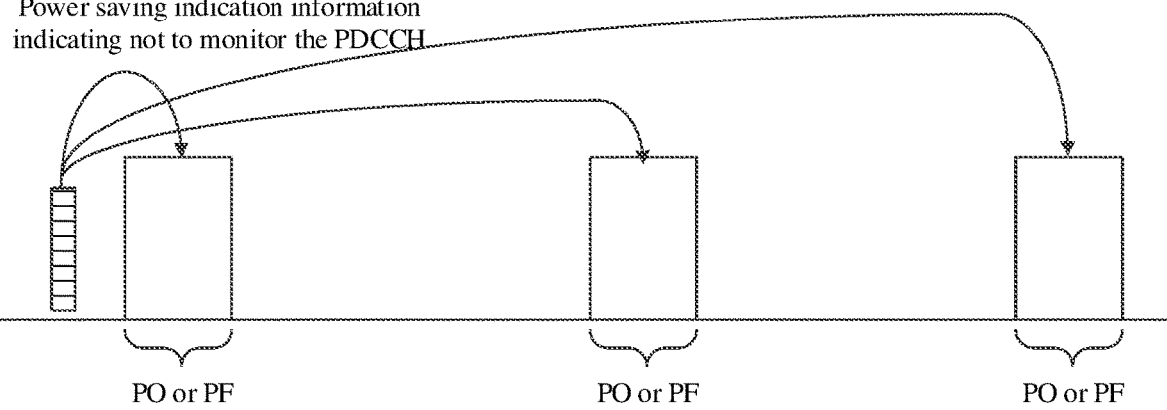
FIG. 15 is still yet another schematic diagram showing a terminal device receiving a paging message according to an embodiment of the present disclosure.

In other embodiments, still yet another schematic diagram showing the terminal device receiving the paging message is as illustrated in FIG. 15. The power saving indication information may indicate whether the paging message is received on a plurality of POs or PFs.

It should be understood that in the various embodiments of the present disclosure, numerical values of sequence numbers of the above processes do not mean an execution order as the execution order of individual processes should be determined by their functions and internal logics, and should not constitute any limitation to an implementation process of the embodiments of the present disclosure.

To implement the paging indication method according to the embodiments of the present disclosure, embodiments of the present disclosure further provide a terminal device. An optional composition structure of a terminal device 600 is as illustrated in FIG. 16 and includes a receiving unit 601.

The receiving unit 601 is configured to receive power saving indication information in a first search space set. The power saving indication information indicates whether the terminal device needs to receive a paging message in a target paging occasion group or a target paging frame group.

In some embodiments, the target paging occasion group includes a paging occasion group of the terminal device; or the target paging frame group includes a paging frame group of the terminal device.

In some embodiments, the target paging occasion group includes a common paging occasion group; or the target paging frame group includes a common paging frame group.

In some embodiments, the target paging occasion group or the target paging frame group is predefined; or the target paging occasion group or the target paging frame group is pre-configured; or the target paging occasion group or the target paging frame group is configured via signaling.

In some embodiments, the power saving indication information is carried in first DCI. The first DCI is DCI in a format 1-0 and scrambled with a P-RNTI.

In some embodiments, short message indication information of the first DCI and/or bit information corresponding to short message information indicates whether the terminal device needs to receive the paging message in the target paging occasion group or the target paging frame group.

In some embodiments, the short message indication information of the first DCI indicates that the first DCI carries the power saving indication information.

In some embodiments, the power saving indication information is carried in second DCI. The second DCI is DCI in a format 2-6 and scrambled with a PS-RNTI.

In some embodiments, wake-up indication bit information of the second DCI indicates whether the terminal device needs to receive the paging message in the target paging occasion group or the target paging frame group.

In some embodiments, secondary cell sleep indication bit information of the second DCI indicates the target paging occasion group or the target paging frame group.

In some embodiments, the receiving unit 601 is further configured to detect, in the first search space set, DCI in a format 1-0 and carrying paging indication information.

In some embodiments, the target paging occasion group or the target paging frame group is indicated by a bitmap.

In some embodiments, bit information of each bit in the bitmap indicates whether reception of the paging message in a paging occasion group or a paging frame group corresponding to the bit is needed.

In some embodiments, the first search space set is a search space set configured for the terminal device to receive paging indication information.

In some embodiments, the first search space set is a search space set configured for the terminal device to receive the power saving indication information only.

In some embodiments, a monitoring occasion of the power saving indication information is determined based on a PO or a paging frame.

In some embodiments, the monitoring occasion of the power saving indication information includes On Duration, prior to one paging frame or PO, of a complete search space for a PDCCH between a configured time offset and a minimum time interval.

To implement the paging indication method according to the embodiments of the present disclosure, embodiments of the present disclosure further provide a network device. An optional composition structure of a network device 800 is as illustrated in FIG. 17 and includes a transmitting unit 801.

The transmitting unit 801 is configured to transmit power saving indication information in a first search space set. The power saving indication information indicates whether a terminal device needs to receive a paging message in a target paging occasion group or a target paging frame group.

In some embodiments, the target paging occasion group includes a paging occasion group of the terminal device; or the target paging frame group includes a paging frame group belong to the terminal device.

In some embodiments, the target paging occasion group includes a common paging occasion group; or the target paging frame group includes a common paging frame group.

In some embodiments, the target paging occasion group or the target paging frame group is predefined; or the target paging occasion group or the target paging frame group is pre-configured; or the target paging occasion group or the target paging frame group is configured via signaling.

In some embodiments, the power saving indication information is carried in first DCI. The first DCI is DCI in a format 1-0 and scrambled with a P-RNTI.

In some embodiments, short message power saving indication information of the first DCI and/or bit information corresponding to short message information indicates whether the terminal device needs to receive bit information of the paging message in the target paging occasion group or the target paging frame group.

In some embodiments, short message indication information of the first DCI indicates that the first DCI carries the power saving indication information.

In some embodiments, the power saving indication information is carried in second DCI. The second DCI is DCI in a format 2-6 and scrambled with a PS-RNTI.

In some embodiments, wake-up indication bit information of the second DCI indicates whether the terminal device needs to receive the paging message in the target paging occasion group or the target paging frame group.

In some embodiments, secondary cell sleep indication bit information of the second DCI indicates the target paging occasion group or the target paging frame group.

In some embodiments, the transmitting unit 801 is further configured to transmit, in the first search space set, DCI in a format 1-0 and carrying paging indication information.

In some embodiments, the target paging occasion group or the target paging frame group is indicated by a bitmap.

In some embodiments, bit information of each bit in the bitmap indicates whether reception of the paging message in a paging occasion group or a paging frame group corresponding to the bit is needed.

In some embodiments, the first search space set is a search space set configured for the terminal device to receive paging indication information.

In some embodiments, the first search space set is a search space set configured for the terminal device to receive the power saving indication information only.

In some embodiments, a monitoring occasion of the power saving indication information is determined based on a PO or a paging frame.

In some embodiments, the monitoring occasion of the power saving indication information includes On Duration, prior to one paging frame or PO, of a complete search space for a PDCCH between a configured time offset and a minimum time interval.

According to an embodiment of the present disclosure, a terminal device is further provided. The terminal device includes a processor, and a memory for storing a computer program executable on the processor. The processor is configured to execute the computer program to perform the steps of the paging indication method performed by the above-mentioned terminal device.

According to an embodiment of the present disclosure, a network device is further provided. The network device includes a processor, and a memory for storing a computer program executable on the processor. The processor is configured to execute the computer program to perform the steps of the paging indication method performed by the above-mentioned network device.

According to an embodiment of the present disclosure, a chip is further provided. The chip includes a processor. The processor is configured to invoke and execute a computer program from a memory to cause an apparatus provided with the chip to perform the paging indication method performed by the above-mentioned terminal device.

According to an embodiment of the present disclosure, a chip is further provided. The chip includes a processor. The processor is configured to invoke and execute a computer program from a memory to cause an apparatus provided with the chip to perform the paging indication method performed by the above-mentioned network device.

According to an embodiment of the present disclosure, a storage medium is further provided. The storage medium stores an executable program. The executable program, when executed by a processor, implements the paging indication method performed by the above-mentioned terminal device.

According to an embodiment of the present disclosure, a storage medium is further provided. The storage medium stores an executable program. The executable program, when executed by a processor, implements the paging indication method performed by the above-mentioned network device.

According to an embodiment of the present disclosure, a computer program product is further provided. The computer program product includes computer program instructions. The computer program instructions cause a computer to perform the paging indication method performed by the above-mentioned terminal device.

According to an embodiment of the present disclosure, a computer program product is further provided. The computer program product includes computer program instructions. The computer program instructions cause a computer to perform the paging indication method performed by the above-mentioned network device.

According to an embodiment of the present disclosure, a computer program is further provided. The computer program causes a computer to perform the paging indication method performed by the above-mentioned terminal device.

According to an embodiment of the present disclosure, a computer program is further provided. The computer program causes a computer to perform the paging indication method performed by the above-mentioned network device.

FIG. 18 is a schematic diagram showing a hardware composition structure of an electronic device (terminal device or network device) according to an embodiment of the present disclosure. An electronic device 700 includes at least one processor 701, a memory 702, and at least one network interface 704. Various components of the electronic device 700 are coupled together via a bus system 705. It can be appreciated that that the bus system 705 is configured to implement connections and communication among these components. The bus system 705 further includes a power bus, a control bus, and a state signal bus in addition to a data bus. In the interest of clarity, however, all the buses are labeled as the bus system 705 in FIG. 18.

It can be appreciated that the memory 702 may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), a Ferromagnetic Random Access Memory (FRAM), a flash memory, a magnetic surface memory, an optical disc, or a Compact Disc Read-Only Memory (CD-ROM). The magnetic surface memory may be a disk memory or a magnetic tape memory. The transitory memory may be a Random Access Memory (RAM), which is used as an external cache. By way of illustration, rather than limitation, many forms of RAMs are available, including a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 702 described in the embodiments of the present disclosure is intended to include, but not limited to, these and any other suitable types of memories.

The memory 702 according to any of the embodiments of the present disclosure is configured to store various types of data to support operations of the electronic device 700. Examples of such data include any computer program for operation on the electronic device 700, e.g., an application 7022. A program for implementing the method according to any of the embodiments of the present disclosure may be included in the application 7022.

The method disclosed in the above embodiments of the present disclosure may be applied in or implemented by the processor 701. The processor 701 may be an integrated circuit chip with signal processing capability. In an implementation, the steps of the above method can be implemented by hardware integrated logic circuits in the processor 701 or instructions in the form of software. The processor 701 can be a general purpose processor, a Digital Signal Processor (DSP), another programmable logic device, a discrete gate or transistor logic device, or a discrete hardware component. The methods, steps, and logical block diagrams disclosed in the embodiments of the present disclosure can be implemented or performed by the processor 701. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a storage medium. The storage medium can be located in the memory 702. The processor 701 can read information from the memory 702 and perform the steps of the above methods in combination with its hardware.

In exemplary embodiments, the electronic device 700 may be implemented by one or more Application Specific Integrated Circuits (ASICs), DSPs, Programmable Logic Devices (PLDs), Complex Programmable Logic Devices (CPLDs), Field Programmable Gate Arrays (FPGAs), general purpose processors, controllers, Microcontroller Units (MCUs), Micro Processor Units (MPUs), or other electronic components, to perform the above methods.

The present disclosure is described with reference to flowcharts and/or block diagrams of the method, the device (system), and the computer program product according to the embodiments of the present disclosure. It should be understood that each process and/or block in the flowcharts and/or block diagrams, and a combination of processes and/or blocks in the flowcharts and/or block diagrams can be realized by computer program instructions. These computer program instructions can be provided to a processor of a general-purpose computer, a special-purpose computer, an embedded processor, or other programmable data processing device to generate a machine, such that instructions executed by the processor of the computer or other programmable data processing devices generate an apparatus for implementing functions specified in one or more processes in the flowchart and/or one or more blocks in the block diagram.

These computer program instructions can also be stored in a computer-readable memory that can guide a computer or other programmable data processing devices to work in a specific manner, such that instructions stored in the computer-readable memory produce an article of manufacture including an instruction device. The instruction device implements functions specified in one or more processes in the flowchart and/or one or more blocks in the block diagram.

These computer program instructions can also be loaded on a computer or other programmable data processing devices to enable a series of operation steps to be executed on the computer or other programmable devices for producing computer-implemented processing, such that instructions executed on the computer or other programmable devices provide steps for implementing functions specified in one or more processes in the flowchart and/or one or more blocks in the block diagram.

It should be understood that terms "system" and "network" in the present disclosure are often used interchangeably herein. The term "and/or" in the present disclosure only represents an association relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

While the preferred embodiments of the present disclosure have been described above, the protection scope of the present disclosure is not limited to these embodiments. Any modification, equivalent replacement, improvement, or the like made within the spirit and principle of the present disclosure shall fall within the protection scope of the present disclosure.

What is claimed is:

1. A paging indication method, comprising:
receiving, by a terminal device, power saving indication information in a first search space set, the power saving indication information indicating whether the terminal device needs to receive a paging message in a target paging occasion group or a target paging frame group;
wherein the first search space set is a search space set configured for the terminal device to receive the power saving indication information only; and
a monitoring occasion of the power saving indication information is determined based on a paging frame, the monitoring occasion of the power saving indication information comprising on duration, prior to the paging frame, of a complete search space for a physical downlink control channel (PDCCH) between a configured time offset and a minimum time interval, wherein the configured time offset is a starting point of a PDCCH monitoring occasion, and the minimum time interval is an end point of the PDCCH monitoring occasion.

2. The method according to claim 1, wherein the target paging occasion group comprises a paging occasion group of the terminal device; or
the target paging frame group comprises a paging frame group belong to the terminal device.

3. The method according to claim 1, wherein the target paging occasion group comprises a common paging occasion group; or
the target paging frame group comprises a common paging frame group.

4. The method according to claim 1, wherein the target paging occasion group or the target paging frame group is configured via signaling.

5. The method according to claim 1, wherein the target paging occasion group is indicated by a bitmap.

6. The method according to claim 5, wherein bit information of each bit in the bitmap indicates whether reception of the paging message in a paging occasion group corresponding to the bit is needed.

7. A paging indication method, comprising:
transmitting, by a network device, power saving indication information in a first search space set, the power saving indication information indicating whether a terminal device needs to receive a paging message in a target paging occasion group or a target paging frame group;
wherein the first search space set is a search space set configured for the terminal device to receive the power saving indication information only; and
a monitoring occasion of the power saving indication information is determined based on a paging frame, the monitoring occasion of the power saving indication information comprising on duration, prior to the paging frame, of a complete search space for a physical downlink control channel (PDCCH) between a configured time offset and a minimum time interval, wherein the configured time offset is a starting point of a PDCCH monitoring occasion, and the minimum time interval is an end point of the PDCCH monitoring occasion.

8. The method according to claim 7, wherein the target paging occasion group comprises a paging occasion group of the terminal device; or the target paging frame group comprises a paging frame group belong to the terminal device.

9. The method according to claim 7, wherein the target paging occasion group comprises a common paging occasion group; or the target paging frame group comprises a common paging frame group.

10. The method according to claim 7, wherein the target paging occasion group or the target paging frame group is configured via signaling.

11. A terminal device, comprising a processor, and a memory for storing a computer program executable on the processor, wherein the processor is configured to execute the computer program to cause the terminal device to receive power saving indication information in a first search space set, the power saving indication information indicating whether the terminal device needs to receive a paging message in a target paging occasion group or a target paging frame group;

wherein the first search space set is a search space set configured for the terminal device to receive the power saving indication information only; and a monitoring occasion of the power saving indication information is determined based on a paging frame, the monitoring occasion of the power saving indication information comprising on duration, prior to the paging frame, of a complete search space for a physical downlink control channel (PDCCH) between a configured time offset and a minimum time interval, wherein the configured time offset is a starting point of a PDCCH monitoring occasion, and the minimum time interval is an end point of the PDCCH monitoring occasion.

12. The terminal device according to claim 11, wherein the target paging occasion group comprises a paging occasion group of the terminal device; or the target paging frame group comprises a paging frame group belong to the terminal device.

13. The terminal device according to claim 11, wherein the target paging occasion group comprises a common paging occasion group; or the target paging frame group comprises a common paging frame group.

14. The terminal device according to claim 11, wherein the target paging occasion group or the target paging frame group is configured via signaling.

15. The terminal device according to claim 11, wherein the target paging occasion group is indicated by a bitmap.

16. The terminal device according to claim 15, wherein bit information of each bit in the bitmap indicates whether reception of the paging message in a paging occasion group corresponding to the bit is needed.

17. A network device, comprising a processor, and a memory for storing a computer program executable on the processor, wherein the processor is configured to execute the computer program to perform the steps of the paging indication method according to claim 7.

18. The network device according to claim 17, wherein the target paging occasion group comprises a paging occasion group of the terminal device; or the target paging frame group comprises a paging frame group belong to the terminal device.

19. The network device according to claim 17, wherein the target paging occasion group comprises a common paging occasion group; or the target paging frame group comprises a common paging frame group.

20. The network device according to claim 17, wherein the target paging occasion group or the target paging frame group is configured via signaling.

* * * * *